(12) United States Patent
Hyslop et al.

(10) Patent No.: US 10,911,105 B2
(45) Date of Patent: Feb. 2, 2021

(54) AIR TO GROUND COMMUNICATION SYSTEM WITH SEPARATE CONTROL AND TRAFFIC CHANNELS

(71) Applicant: SMARTSKY NETWORKS LLC, Charlotte, NC (US)

(72) Inventors: Douglas Hyslop, Vienna, VA (US); Gerard James Hayes, Wake Forest, NC (US); Elbert Stanford Eskridge, Jr., Chapel Hill, NC (US)

(73) Assignee: SMARTSKY NETWORKS, LLC, Morrisville, NC (US)

( * ) Notice: Subject to any disclaimer, the term of this patent is extended or adjusted under 35 U.S.C. 154(b) by 570 days.

(21) Appl. No.: 15/208,738

(22) Filed: Jul. 13, 2016

(65) Prior Publication Data
US 2018/0019789 A1    Jan. 18, 2018

(51) Int. Cl.
| H04B 7/04 | (2017.01) |
| H04B 7/06 | (2006.01) |
| H04W 88/08 | (2009.01) |
| H04B 7/185 | (2006.01) |

(52) U.S. Cl.
CPC ............ *H04B 7/04* (2013.01); *H04B 7/0617* (2013.01); *H04B 7/18506* (2013.01); *H04W 88/085* (2013.01)

(58) Field of Classification Search
None
See application file for complete search history.

(56) References Cited

U.S. PATENT DOCUMENTS

| 2012/0200458 A1* | 8/2012 | Jalali | H01Q 1/2291 342/372 |
| 2012/0208541 A1* | 8/2012 | Luo | H04W 72/082 455/437 |
| 2014/0050280 A1* | 2/2014 | Stirling-Gallacher | H04B 7/0486 375/296 |
| 2014/0235287 A1* | 8/2014 | Maltsev | H04W 52/267 455/522 |
| 2014/0274075 A1* | 9/2014 | Hyslop | H04W 16/24 455/446 |
| 2015/0358791 A1* | 12/2015 | Wang | H04L 29/06 370/328 |
| 2016/0099761 A1* | 4/2016 | Chen | H04B 7/0408 370/336 |

(Continued)

FOREIGN PATENT DOCUMENTS

WO    2015038591 A1    3/2015

OTHER PUBLICATIONS

International Search Report and Written Opinion of PCT/US2017/041819 dated Oct. 4, 2017, all enclosed pages cited.

*Primary Examiner* — Zhitong Chen
(74) *Attorney, Agent, or Firm* — Burr & Forman, LLP

(57) ABSTRACT

A base station within a network for providing ATG wireless communication in various cells may include an antenna array defining a plurality of wedge shaped sectors having respective widths defined in azimuth, and a beamforming control module. The beamforming control module may be configured to communicate with the antenna array via a first RF chain to perform beamforming defining traffic channel beams having a first width, and a second RF chain to perform beamforming defining control channel beams having a second width. The second width may be greater than the first width.

19 Claims, 4 Drawing Sheets

(56) References Cited

U.S. PATENT DOCUMENTS

2016/0099769 A1* 4/2016 Moffatt .............. H04B 7/18506
455/431
2017/0324454 A1* 11/2017 Merkel ................ H04B 7/0413

* cited by examiner

AIR TO GROUND COMMUNICATION SYSTEM WITH SEPARATE CONTROL AND TRAFFIC CHANNELS

TECHNICAL FIELD

Example embodiments generally relate to air-to-ground (ATG) wireless communications and, more particularly, relate to employing beamforming for antennas used for ATG communications.

BACKGROUND

High speed data communications and the devices that enable such communications have become ubiquitous in modern society. These devices make many users capable of maintaining nearly continuous connectivity to the Internet and other communication networks. Although these high speed data connections are available through telephone lines, cable modems or other such devices that have a physical wired connection, wireless connections have revolutionized our ability to stay connected without sacrificing mobility.

However, in spite of the familiarity that people have with remaining continuously connected to networks while on the ground, people generally understand that easy and/or cheap connectivity will tend to stop once an aircraft is boarded. Aviation platforms have still not become easily and cheaply connected to communication networks, at least for the passengers onboard. Attempts to stay connected in the air are typically costly and have bandwidth limitations or high latency problems. Moreover, passengers willing to deal with the expense and issues presented by aircraft communication capabilities are often limited to very specific communication modes that are supported by the rigid communication architecture provided on the aircraft.

Conventional ground based wireless communications systems use vertical antennas to provide coverage for device connectivity concentrated near the ground. However, aircraft operate in three dimensional space that extends far above the ground. Thus, it can be appreciated that significant changes would be needed to be able to provide three dimensional coverage for aircraft up to cruising altitudes as high as 45,000 ft.

In typical wireless technologies, logical channels are formed for data carried over the radio interface. The logical channels define what type of information is transmitted over the air such that both data and signaling messages are carried on the logical channels. The logical channels may include control channels and traffic channels. The control channels carry control plane information while the traffic channels carry user-plane data. In a terrestrial wireless communication environment, control and traffic beams are generated in the context of a single RF chain and feed because the specific location of users to be served is generally unknown so equally wide beams are generally needed for both. However, the ATG context presents a different situation entirely insofar as it may be possible to know the location of the users to be served. Thus, a different structure and approach to beam forming may be possible.

BRIEF SUMMARY OF SOME EXAMPLES

The continuous advancement of wireless technologies offers new opportunities to provide wireless coverage for aircraft using antennas with unique beamforming capabilities installed at ground sites.

In one example embodiment, a network for providing air-to-ground (ATG) wireless communication in various cells is provided. The network includes a first base station having a first antenna array defining a plurality of first sectors having respective widths defined in azimuth, and a second base station having a second antenna array defining a plurality of second sectors having respective widths defined in azimuth. The first base station and the second base station are disposed offset from each other along a first direction. Each of the first and second base stations includes a beamforming control module configured to communicate with the first and second antenna arrays, respectively, via a first RF chain to perform beamforming defining traffic channel beams having a first width, and a second RF chain to perform beamforming defining control channel beams having a second width. The second width being greater than the first width.

In another example embodiment, a base station within a network for providing ATG wireless communication in various cells is provided. The base station may include an antenna array defining a plurality of wedge shaped sectors having respective widths defined in azimuth, and a beamforming control module. The beamforming control module may be configured to communicate with the antenna array via a first RF chain to perform beamforming defining traffic channel beams having a first width, and a second RF chain to perform beamforming defining control channel beams having a second width. The second width may be greater than the first width.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
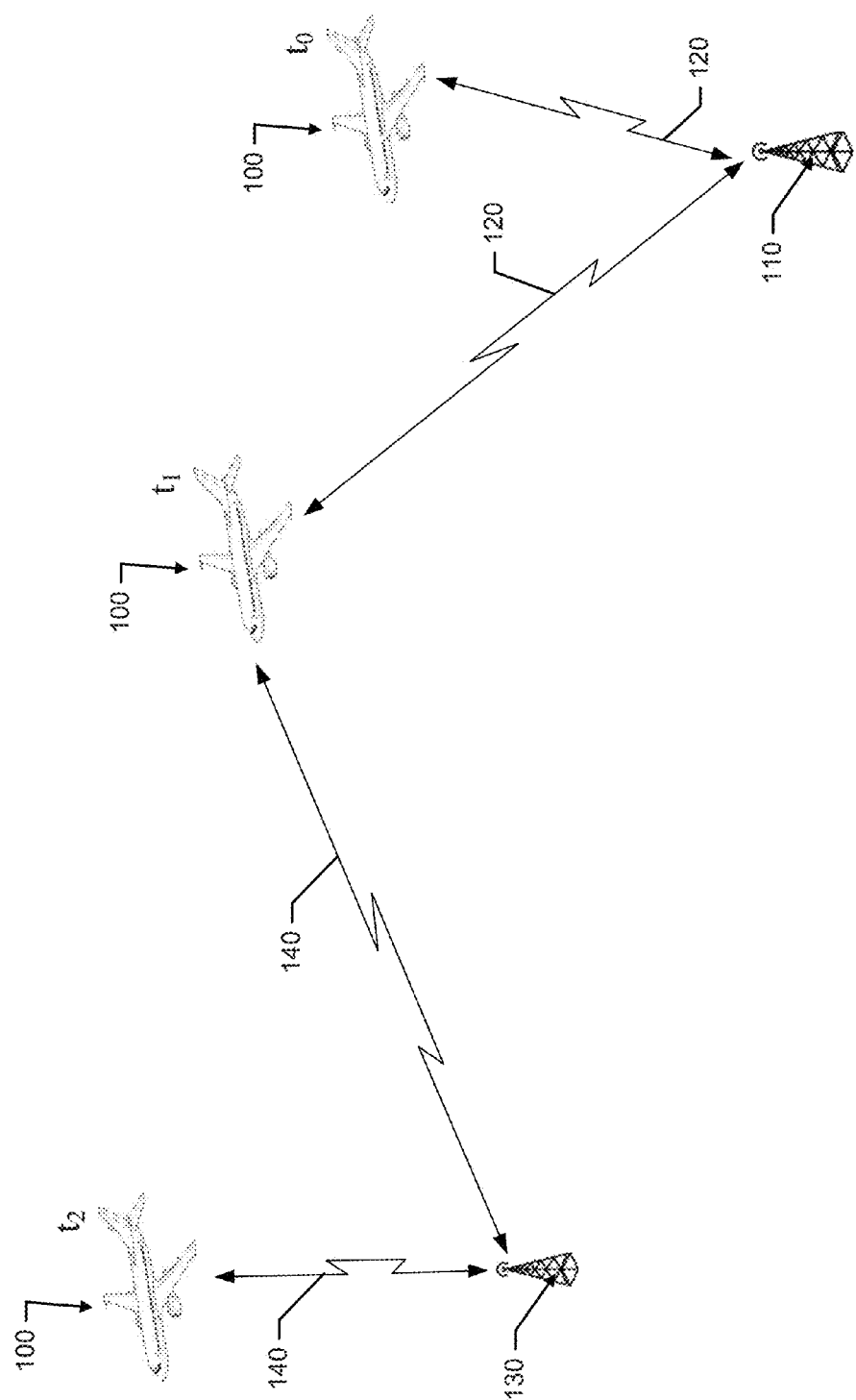
FIG. 1 illustrates an aircraft moving through the coverage areas of different base stations over time in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

In some example embodiments, a plurality of antennas at a base station can form individual sectors (in azimuth) that can be combined to achieve semicircular (or circular) coverage areas around the base station. The sectors can also be defined between two elevation angles to define a wedge shaped coverage area or cell that extends away from the base station between the two elevation angles. Within each sector, a plurality of directional beams may be formed, and selection of specific ones of the directional beams can result in effectively enabling steering of the beams in both azimuth and elevation within the sector by selecting respective directional beams in sequence. The directional beams also have azimuth and elevation widths that define the size of the directional beams. Thus, beams can be swept in azimuth at a constant elevation angle within a respective sector to define the curved surface of a portion of a cone having its apex at the base station. Of note, the curved surface may technically have a wedge shape as well since it extends between elevation angles defining the height of the steerable beam. Considering multiple sectors, a beam could effectively be swept or steered around the base station (by selecting corresponding directional beams) at the same elevation angle to define the cone shape (or portion thereof depending on how many sectors the beam was swept through). The cone shape defined would generally have a radius much longer than the height of the cone (e.g., nearly the length of the sides of the cone shape). Since the beams are effectively steerable in elevation as well, a concentric curved surface can also be swept at different elevation angles over the range of azimuths within one or more sectors to define slightly different and concentric cone shapes (or portions thereof). Thus, the steering capability may allow directional beams to be effectively "steered" toward a moving aircraft to follow the aircraft's movement. This, of course, requires some knowledge of the location of the aircraft, which is knowledge that is generally not needed or employed in the terrestrial context.

Additionally, some example embodiments may employ separate RF chains and feeds for the antenna structures of the ground stations. Thus, for example, at the logical layer, separate control beams and traffic beams can be generated using a single antenna structure. The control beams and the traffic beams can be generated to have different beam characteristics (e.g., different widths in azimuth and/or elevation). In some cases, for example, the traffic beams can be narrower, and the control beams can be wider. The ability to know something about target (e.g., aircraft) location and provide different width control and traffic beams may enable a single antenna structure to functionally operate as two antennas. One such functional antenna may have wider directional beams than the other functional antenna.

Accordingly, some example embodiments described herein may provide architectures for improved air-to-ground (ATG) wireless communication performance. In this regard, some example embodiments may provide for base stations having antenna structures that facilitate providing wireless communication coverage via beamforming of separate control and traffic beams so that different sizes of such beams can be provided. Furthermore, example embodiments may enable the beams (of different sizes) to be formed and selected for effective steering in vertical and horizontal directions with sufficient elevation to communicate with aircraft at high elevations. A base station can provide a wedge shaped coverage area in which steerable beams can be steered to achieve coverage at a predetermined altitude within a predetermined distance from the base station to facilitate ATG wireless communications. The wedge shaped coverage area can be substantially semicircular (or circular) in the horizontal plane, and can be provided by multiple antennas each providing a wedge shaped sector over a portion of the semicircular azimuth. The base stations can be deployed as substantially aligned in a first direction while offset in a second direction. For example, the base stations can also be deployed in the first direction at a first distance to provide coverage overlapping in elevation to achieve coverage over the predetermined altitude, and within a second distance in the second direction based on an achievable coverage area distance of the sectors. The steerable beams may be steerable in both azimuth and elevation angle to define cell coverage areas that are defined between elevation angle limits that are centered at and extend away from the base stations aimed just above the horizon. By providing the cells to extend toward the horizon, the coverage area above any particular base station may not be provided by that base station. Instead, an adjacent base station may provide coverage above each individual base station in order to reduce the possibility of interference from ground based emitters since the aircraft can look to the horizon for service instead of directly below, where the majority of interferers within range would be expected to be located.

FIG. 1 illustrates a conceptual view of an aircraft moving through a coverage zone of different base stations to illustrate an example embodiment. As can be seen in FIG. 1, an aircraft 100 may be in communication with a first base station (BS) 110 at time $t_0$ via a first wireless communication link 120. The aircraft 100 may therefore include wireless communication equipment onboard that enables the aircraft 100 to communicate with the first BS 110, and the first BS 110 may also include wireless communication equipment enabling communication with the aircraft 100. As will be discussed in greater detail below, the wireless communication equipment at each end may include radio hardware and/or software for processing wireless signals received at corresponding antenna arrays that are provided at each respective device in communication with their respective radios. Moreover, the wireless communication equipment of example embodiments may be configured to employ beamforming techniques to utilize directive focusing, steering, and/or formation of beams using the antenna arrays. Accordingly, for the purposes of this discussion, it should be assumed that the first wireless communication link 120 between the aircraft 100 and the first BS 110 may be formed using at least one link established via beamforming. In other words, either the first BS 110 or the aircraft 100, or both, may include radio control circuitry capable of employing beamforming techniques for establishment of the first wireless communication link 120.

A second BS 130, which may have similar performance and functional characteristics to those of the first BS 110, may be located geographically such that, for the current track of the aircraft 100, the second BS 130 is a candidate for handover of the aircraft 100 to maintain a continuous and uninterrupted communication link between the aircraft 100 and ground-based base stations of an ATG wireless communication network at time $t_1$. It may be helpful for the second BS 130 to be aware of the approach of the aircraft 100 so that the second BS 130 can employ beamforming techniques to direct/select a beam aimed toward the expected location of the aircraft 100. Additionally or alternatively, it may be helpful for the aircraft 100 to be aware of the existence and location of the second BS 130 so that the wireless communication equipment on the aircraft 100 may employ beamforming techniques to direct a beam toward the second BS 130. Thus, at least one of the second BS 130 or the wireless communication equipment on the aircraft 100 may employ beamforming techniques assisted by knowledge of position information to facilitate establishment of a second wireless communication link 140 between the wireless communication equipment on the aircraft 100 and the second BS 130. Thereafter, by time $t_2$, the first communication link 120 may be dropped and the aircraft 100 may only be served by the second BS 130 via the second wireless communication link 140. In some cases, the handover between the first BS 110 and the second BS 130 may be a hard handoff managed from the ground side of the ATG wireless communication network.

Figure 2:
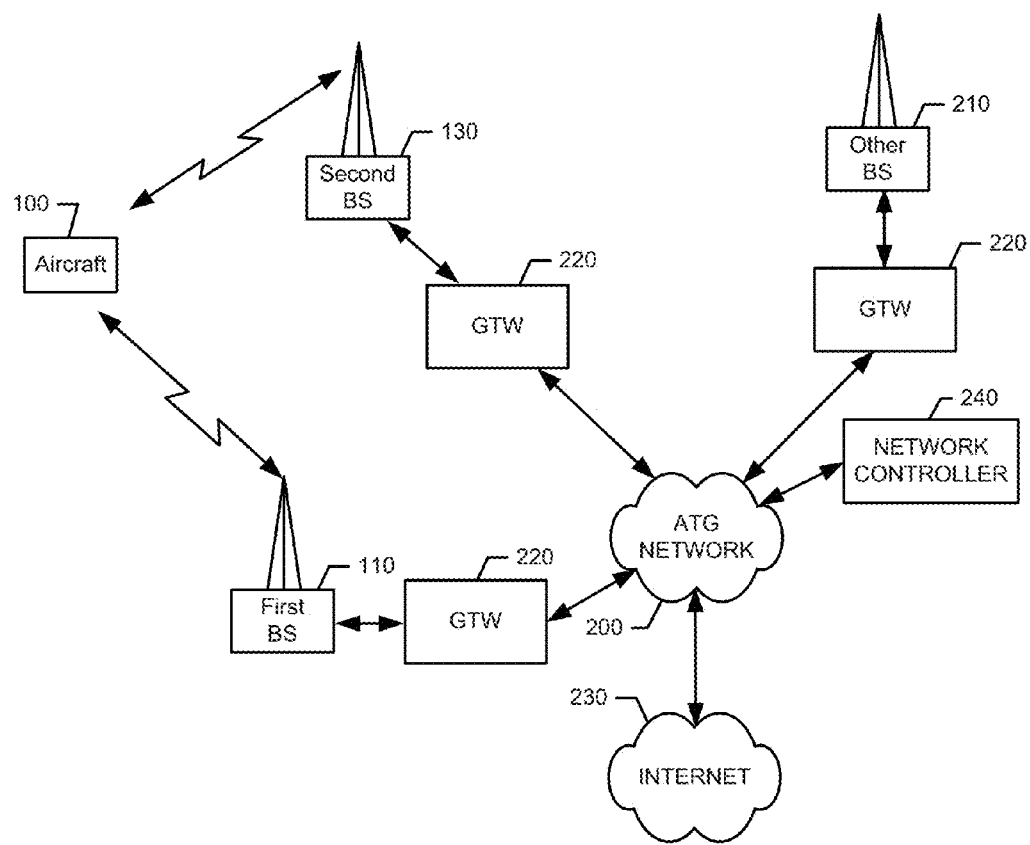
FIG. 2 illustrates a block diagram of a system for employing positional information for assisting with beamforming in accordance with an example embodiment.

In accordance with an example embodiment, a beamforming control module may be provided that employs knowledge of position information regarding a receiving station on an aircraft or ground stations to assist in application of beamforming techniques. Of note, beamforming techniques in accordance with some example embodiments may include selection of one of a plurality of fixed beams, where the selected fixed beam is aimed at the desired location. Thus, beam steering or beamforming should be understood to also encompass selection of a fixed beam having a desired orientation or projection pattern (e.g., beam selection). In any case, one or more instances of the beamforming control module of an example embodiment may be physically located at any (or all) of a number of different locations within an ATG communication network. FIG. 2 illustrates a functional block diagram of an ATG communication network that may employ an example embodiment of such a beamforming control module at the remote radio head proximate to the antenna array of a base station.

As shown in FIG. 2, the first BS 110 and second BS 130 may each be base stations of an ATG network 200. The ATG network 200 may further include other BSs 210, and each of the BSs may be in communication with the ATG network 200 via a gateway (GTW) device 220. The ATG network 200 may further be in communication with a wide area network such as the Internet 230 or other communication networks. In some embodiments, the ATG network 200 may include or otherwise be coupled to a packet-switched core network.

In an example embodiment, the ATG network 200 may include a network controller 240 that may include, for example, switching functionality. Thus, for example, the network controller 240 may be configured to handle routing calls to and from the aircraft 100 (or to communication equipment on the aircraft 100) and/or handle other data or communication transfers between the communication equipment on the aircraft 100 and the ATG network 200. In some embodiments, the network controller 240 may function to provide a connection to landline trunks when the communication equipment on the aircraft 100 is involved in a call. In addition, the network controller 240 may be configured for controlling the forwarding of messages and/or data to and from the aircraft 100 or a mobile terminal on the aircraft 100, and may also control the forwarding of messages for the base stations. It should be noted that although the network controller 240 is shown in the system of FIG. 2, the network controller 240 is merely an exemplary network device and example embodiments are not limited to use in a network employing the network controller 240.

The network controller 240 may be coupled to a data network, such as a local area network (LAN), a metropolitan area network (MAN), and/or a wide area network (WAN) (e.g., the Internet 230) and may be directly or indirectly coupled to the data network. In turn, devices such as processing elements (e.g., personal computers, laptop computers, smartphones, server computers or the like) can be coupled to the communication equipment on the aircraft 100 via the Internet 230.

Although not every element of every possible embodiment of the ATG network 200 is shown and described herein, it should be appreciated that the communication equipment on the aircraft 100 may be coupled to one or more of any of a number of different networks through the ATG network 200. In this regard, the network(s) can be capable of supporting communication in accordance with any one or more of a number of first-generation (1G), second-generation (2G), third-generation (3G), fourth-generation (4G) and/or future mobile communication protocols or the like. In some cases, the communication supported may employ communication links defined using unlicensed band frequencies such as 2.4 GHz or 5.8 GHz. However, licensed band communication, such as communication in a frequency band dedicated to ATG wireless communication, may also be supported.

As indicated above, a beamforming control module may be employed on wireless communication equipment at either or both of the network side or the aircraft side in example embodiments. Thus, in some embodiments, the beamforming control module may be implemented in a receiving station on the aircraft (e.g., a passenger device or device associated with the aircraft's communication system). In some embodiments, the beamforming control module may be implemented in the network controller 240, at one or more of the base stations, or at some other network side entity. Moreover, in some example embodiments, beamforming may be accomplished by providing location/position information at a remote radio head (RRH) of the base stations to enable antenna beamforming as described herein.

Figure 3:
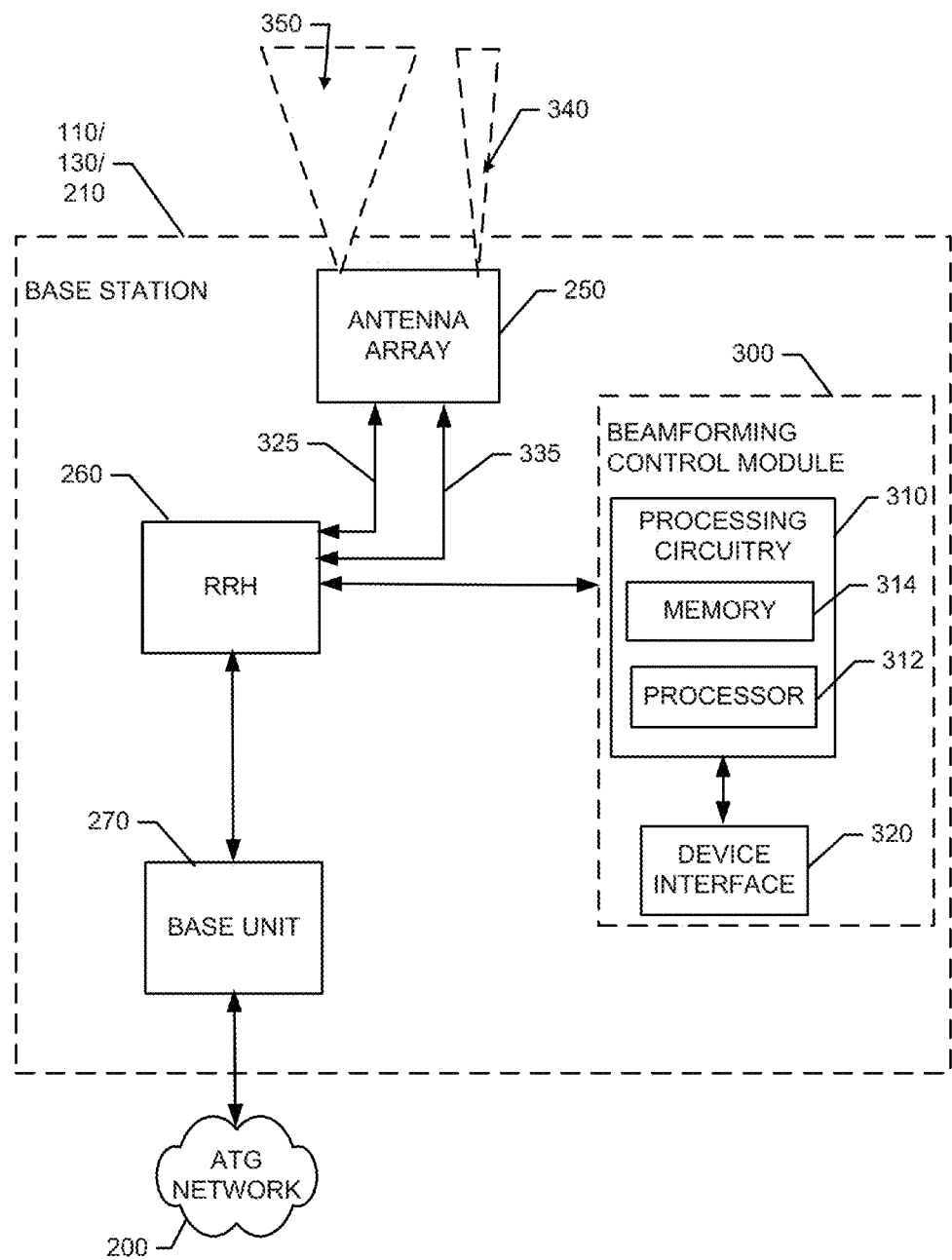
FIG. 3 illustrates control circuitry that may be employed to assist in using positional information for assisting with beamforming at the remote radio head according to an example embodiment.

FIG. 3 illustrates the architecture of a base station (e.g., BS 110, BS 130 or BS 210) employing a beamforming control module 300 in accordance with an example embodiment. As shown in FIG. 3, the base station may include an antenna array 250, a remote radio head (RRH) 260 and a base unit 270. The base unit 270 may include power supply, backhaul connectivity, and various signal processing and other processing capabilities typically associated with a base station. In a typical situation, the base unit 270 may be operably coupled to the antenna array 250 to interact with the antenna array 250 to receive inbound signals therefrom and to direct the antenna array 250 relative to beam formation for creating communication links with in-flight aircraft (e.g., aircraft 100). However, in a typical situation, the base station may also include a tower or mast that can be relatively high. Thus, to the extent that the transmitter is located in the base unit 270, high transmission capacity would need to be provided between the base unit 270 and the antenna array 250 via cabling extending as far as several hundred feet. To minimize the cable lengths, the RRH 260 may be provided.

The RRH 260 may include RF circuitry and analog-to-digital and/or digital-to-analog converters. The RRH 260 may also include up/down converters and have operational and management capabilities (as discussed below in greater detail). In some cases, the RRH 260 further includes a high-frequency transmitter, and the RRH 260 is provided proximate to the antenna array 250. Thus, the length of high-frequency transmission lines between the RRH 260 and the antenna array 250 can be relatively short. This allows increased efficiency of the base station and reduces the cost associated with expensive and long cables. Meanwhile, a power cable and a data cable (and a control cable if needed) can be provided to operably couple the RRH 260 and the base unit 270. In some cases, the power cable and data cable can be combined into a single hybrid cable.

In an example embodiment, the beamforming control module 300 may be embodied in processing circuitry at the RRH 260. However, other example embodiments may not employ the RRH 260 at all, and the beamforming control module 300 could be instantiated at the base unit 270 in such cases. In any case, the beamforming control module 300 may use location information (or position information) indicative of the location of the aircraft 100 (in relative or absolute terms) to direct the antenna array 250 to form a beam directed toward the aircraft 250. As such, in cases where the RRH 260 is employed, the beamforming control module 300 may interact with the antenna array 250 via the RRH 260 so that the RRH 260 is informed as to where the aircraft 100 is located to allow the RRH 260 to tell the antenna array 250 which specific beam to form to reach the aircraft 100. Moreover, the beamforming control module 300 may be configured to direct formation of the beams to have a limited width in both azimuth and elevation angle, and the beams may be steered in both azimuth and elevation.

In an example embodiment, the beamforming control module 300 may be configured to direct different sized beams to be formed dependent upon whether the beam to be formed is a traffic beam or a control beam. Thus, the base station may include at least two RF chains and corresponding feeds. A first RF chain 325 may be provided to the antenna array 250 to direct formation of traffic channel beams 340. Meanwhile, a second RF chain 335 may be provided to the antenna array 250 to direct formation of control channel beams 350. As can be appreciated from FIG. 3, the control channel beams 350 may be generally wider than the traffic channel beams 340. Given that the location of the target (e.g., the aircraft 100) is known, the control channel beams 350 can be more focused than it would otherwise be in a terrestrial system. Moreover, the traffic channel beams 340 can be even narrower still. Accordingly, the antenna array 250 may be configured to functionally act as two different antennas, one of which generates wider control channel beams 350, and the other of which generates narrower traffic channel beams 340.

One challenge that may be provided by example embodiments is to ensure the control channel provides sufficient coverage to its entire corresponding sector. Wider beams (such as a wider control channel beam) typically have less gain that narrower beams (e.g., focused traffic channel beams). The control channel therefore usually uses a more robust modulation and coding level to help make up the difference. However, in some cases the use of more robust modulation and coding level may not be sufficient to allow the control channel coverage to equal the coverage range of the focused traffic channel.

Since example embodiments provide a separate control channel RF chain from the traffic channel RF chain, some example embodiments may further enable a split of the control channel RF feed so that the RF feed can be sent to more than one antenna, with each antenna pointing into a different azimuth with a more narrow beamwidth. As a result, for example, instead of feeding one RF chain into one antenna with a 60 degree beamwidth, example embodiments may enable a split of the control channel signal into two or more RF feeds and send the signal into two 30 degree beamwidth antennas, or three 20 degree beamwidth antennas, etc. Example embodiments may therefore provide a greater antenna gain to the control channel by further segmenting the RF feed chain for the control channel.

Normally, splitting of the control channel would not make sense. In this regard, if the power amplifier puts out a certain power level, the splitter to go to the two antennas would introduce a 3 dB loss. Thus, given that the more narrow beamwidth of the antenna would result in a 3 dB gain, the gains and losses of the system would net a zero sum gain. However, the example embodiment would realize a net gain in cases where the spectrum licensing rules limit the conducted power into a particular antenna. In such cases, by employing an example embodiment with split RF chains, a net gain can be achieved.

Example embodiments may therefore provide intelligence associated with beamforming that can communicate with an antenna assembly over two separate RF chains, one for control beams and one for traffic beams, so that the provision of amplitude and phase information associated with beamforming can be accomplished with one physical structure, but enable the physical structure to act as two functional antennas. The beamforming control module 300 may include processing circuitry 310 configured to provide control outputs for generation of beams of two distinct sizes at the antenna array 250 disposed the base station based on processing of various input information. The processing circuitry 310 may be configured to perform data processing, control function execution and/or other processing and management services according to an example embodiment. In some embodiments, the processing circuitry 310 may be embodied as a chip or chip set. In other words, the processing circuitry 310 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 310 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 310 may include one or more instances of a processor 312 and memory 314 that may be in communication with or otherwise control a device interface 320. As such, the processing circuitry 310 may be embodied as a circuit chip (e.g., an integrated circuit chip) configured (e.g., with hardware, software or a combination of hardware and software) to perform operations described herein. However, in some embodiments, the processing circuitry 310 may be embodied as a portion of an on-board computer. In some embodiments, the processing circuitry 310 may communicate with various components, entities and/or sensors of the ATG network 200.

The device interface 320 may include one or more interface mechanisms for enabling communication with other devices (e.g., modules, entities, sensors and/or other components of the base station). In some cases, the device interface 320 may be any means such as a device or circuitry embodied in either hardware, or a combination of hardware and software that is configured to receive and/or transmit data from/to modules, entities, sensors and/or other components of the base station that are in communication with the processing circuitry 310.

The processor 312 may be embodied in a number of different ways. For example, the processor 312 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 312 may be configured to execute instructions stored in the memory 314 or otherwise accessible to the processor 312. As such, whether configured by hardware or by a combination of hardware and software, the processor 312 may represent an entity (e.g., physically embodied in circuitry—in the form of processing circuitry 310) capable of performing operations according to example embodiments while configured accordingly. Thus, for example, when the processor 312 is embodied as an ASIC, FPGA or the like, the processor 312 may be specifically configured hardware for conducting the operations described herein. Alternatively, as another example, when the processor 312 is embodied as an executor of software instructions, the instructions may specifically configure the processor 312 to perform the operations described herein.

In an example embodiment, the processor 312 (or the processing circuitry 310) may be embodied as, include or otherwise control the operation of the beamforming control module 300 based on inputs received by the processing circuitry 310 responsive to receipt of position information associated with various locations or relative positions of the communicating elements of the network. As such, in some embodiments, the processor 312 (or the processing circuitry 310) may be said to cause each of the operations described in connection with the beamforming control module 300 in relation to adjustments to be made to antenna arrays to undertake the corresponding functionalities relating to beamforming responsive to execution of instructions or algorithms configuring the processor 312 (or processing circuitry 310) accordingly. For example, the instructions may include instructions for processing 3D position information of a moving receiving station (e.g., on the aircraft 100) along with 2D position information of fixed transmission sites in order to instruct the antenna array 250 to form a traffic beam or control beam with a corresponding size in a direction that will facilitate establishing a communication link between the moving receiving station and one of the fixed transmission stations as described herein.

In an exemplary embodiment, the memory 314 may include one or more non-transitory memory devices such as, for example, volatile and/or non-volatile memory that may be either fixed or removable. The memory 314 may be configured to store information, data, applications, instructions or the like for enabling the processing circuitry 310 to carry out various functions in accordance with example embodiments. For example, the memory 314 could be configured to buffer input data for processing by the processor 312. Additionally or alternatively, the memory 314 could be configured to store instructions for execution by the processor 312. As yet another alternative, the memory 314 may include one or more databases that may store a variety of data sets responsive to input sensors and components. Among the contents of the memory 314, applications and/or instructions may be stored for execution by the processor 312 in order to carry out the functionality associated with each respective application/instruction. In some cases, the applications may include instructions for providing inputs to control operation of the beamforming control module 300 for directing the antenna assembly 250 to form a traffic beam or a control beam in a particular direction, and of the corresponding appropriate size, as described herein.

In an example embodiment, the memory 314 may store position information such as, for example, fixed position information indicative of a fixed geographic location of one or more base stations or dynamic position information indicative of a three dimensional position of the aircraft 100. The processing circuitry 310 may be configured to determine an expected relative position of the aircraft 100 based on the fixed position information and/or the dynamic position information and provide information to the antenna array 250 to direct formation or selection of a beam based on the expected relative position of the aircraft 100 (or simply based on the position information). In other words, the processing circuitry 310 may be configured to utilize information indicative of the locations of aircraft to determine where to point a beam for establishing a communication link to the aircraft. Tracking algorithms may be employed to track dynamic position changes and/or calculate future positions based on current location and rate and direction of movement of the aircraft 100 to facilitate keeping a beam pointed on the aircraft 100. The beamforming control module 300 may therefore (either directly or via the RRH 260) act as a control device that is configured to adjust characteristics of the antenna array 250 to form directionally steerable beams steered in the direction of the expected relative position of the aircraft 100.

In an example embodiment, the dynamic position information may include latitude and longitude coordinates and altitude to provide a position in 3D space. In some cases, the dynamic position information may further include heading and speed so that calculations can be made to determine, based on current location in 3D space, and the heading and speed (and perhaps also rate of change of altitude), a future location of the aircraft 100 at some future time. In some cases, flight plan information may also be used for predictive purposes to either prepare assets for future beamforming actions that are likely to be needed, or to provide planning for network asset management purposes. The dynamic position information may be determined by any suitable method, or using any suitable devices. For example, the dynamic position information may be determined using global positioning system (GPS) information onboard the aircraft 100, based on triangulation of aircraft position based on a direction from which a plurality of signals arrive at the aircraft 100 from respective ones of the base stations, using aircraft altimeter information, using radar information, and/or the like, either alone or in combination with each other.

In some cases, the traffic channel beams 340 may, for example, have azimuth and elevation angle widths of 5 degrees or less. Moreover, in some cases, the traffic channel beams 340 may have azimuth and elevation angle widths of 2 degrees or less. However, larger sized traffic channel beams 340 may also be employed in some embodiments. Meanwhile, the control channel beams 350 may have a width that is at least two to ten times larger than the width of the traffic channel beams 340. Moreover, in some cases, the control channel beams 350 may have a width that covers the entire sector in which the corresponding control channel beam 350 is formed.

Figure 4:
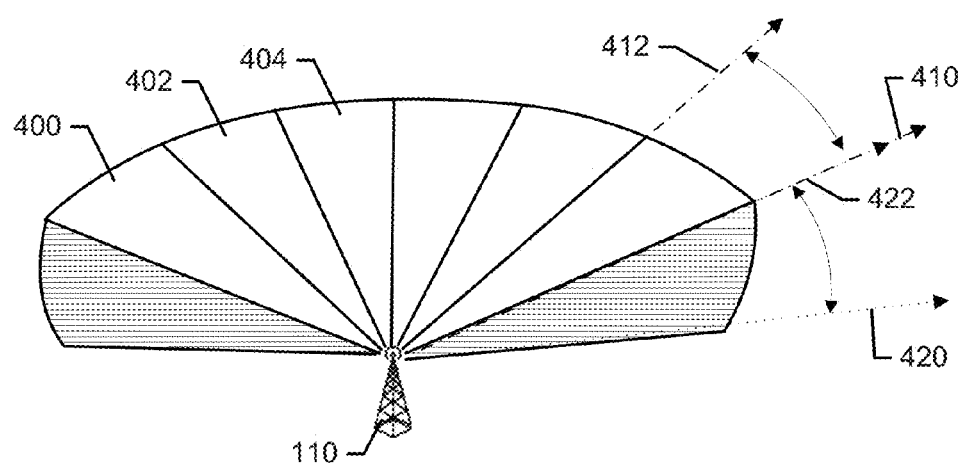
FIG. 4 illustrates a perspective view of coverage areas generated by a base station of an example embodiment.

The structure shown in FIG. 3 may be employed to generate steerable beams in azimuth and/or elevation within sectors defined around a base station. Moreover, example embodiments may form beams that are configured to have a relatively long range (e.g., greater than 100 km) and may be generally aimed just above the horizon. This ensures that communications between base stations and aircraft are not conducted such that the aircraft communicates with ground stations nearby or below the aircraft. Such ground stations would tend to be located proximate to interference sources that could also reach the aircraft. However, by focusing long range beams from a base station toward the horizon to an aircraft, and by focusing beams similarly back toward the base station from the aircraft, interference can be significantly reduced. The resulting coverage areas or communication cells formed around the base stations therefore may have a wedge shape as the coverage areas extend away from the base stations just above the horizon. In some cases, these coverage areas may further be defined by sectors. FIG. 4 illustrates a perspective view of coverage areas (e.g., sectors) generated by a base station of an example embodiment.

The BS 110 of FIG. 4 employs a plurality of antenna elements that form the antenna array 250 of FIG. 3. In the example of FIG. 4, six sectors of thirty degrees each are shown, and the sectors cover about 180 degrees around the BS 110. However, sectors could be formed to have different sizes, and different numbers of sectors could be employed. For example, if the sectors were 60 degrees in width, as few as three sectors could duplicate the coverage area shown in FIG. 4. However, the BS 110 could also as many as twelve sectors in cases where thirty degree sectors are employed and 360 degrees of coverage is desired. The BS 110 is configured to scan within each respective sector as configured by control initiated by the beamforming control module 300.

The individual sectors (e.g., first sector 400, second sector 402, third sector 404, etc.) shown in FIG. 4 are supported by one physical radio supplying wireless communication traffic and control data to the antennas of the BS 110. The radio may support LTE-based traffic and control data in some cases, although modifications to such LTE communications may be effected to support ATG network communications. Each sector may be defined between azimuth boundaries and elevation angle boundaries. Thus, for example, one of the sectors may extend between a first azimuth 410 and a second azimuth 412 and between a first elevation angle 420 and a second elevation angle 422. The width of the azimuth boundaries may determine the number of sectors that are needed to provide the desired amount of coverage around the BS 110.

The sectors are defined between two azimuths to define a triangular or pie shaped sector profile in the vertical plane, and are defined between two elevation angles to define a wedge shaped profile in the vertical plane. Within each of the sectors, beam formation may occur to select desired beam formations to effectively provide for formation of a steerable beam that can be steered in both azimuth and elevation within the sector.

As discussed above, two separate RF chains may be provided so that the steerable beams can have different sizes dependent upon the logical channel for which the beam is being generated. In this regard, for the steerable beam may have azimuth and elevation widths of a first size when the steerable beam is formed in connection with traffic channel beams 340, and the steerable beam may have a second size when the steerable beam is formed in connection with control channel beams 350. The second size may be larger than the first size. Thus, for example, the steerable beam may have azimuth and elevation widths as small as five degrees, or even two degrees, to define the size of the steerable beam when the steerable beam is formed via the first RF chain 325. However, the steerable beams may have larger sizes (e.g., two to ten times larger) including being as large as the entire corresponding sector, when the steerable beam is generated as the control channel beams 350 via the second RF chain 335.

In an example embodiment, the BS 110 employs channels having a frequency determined according to a channel band plan that promotes reduction of interference potential between neighboring BSs. Thus, for example, each BS may have a 10 MHz channel designated for transmission and a separate 10 MHz channel designated for receiving data transmitted by aircraft. Meanwhile, the separate set of paired 10 MHz channels for transmission and receive that are assigned to the BS 110 may be different from the same sized set of paired channels assigned to the second BS 130. Moreover, in an example embodiment, each adjacent BS to the BS 110 along a same direction may have a different 10 MHz channel assignment from each other. Thus, for example, although the ATG network 200 could operate in any suitable spectrum, if the ATG network 200 operated in the unlicensed band, transmission channels for three sequential BSs may be from 2.4078 GHz to 2.4178 GHz for transmission channel A, 2.4178 GHz to 2.4278 GHz for transmission channel B, and 2.4278 GHz to 2.4378 GHz for transmission channel C. Meanwhile, reception channels for the three sequential BSs may include 2.4457 GHz to 2.4557 GHz for reception channel A, 2.4557 GHz to 2.4657 GHz for reception channel B, and 2.4657 GHz to 2.4757 GHz for reception channel C.

If BS 110 operates on channel A for transmission and reception, then the second BS 130 may operate on channel B, while the BS on the opposite side of BS 110 from the second BS 130 would operate on channel C. By repeating this pattern in every direction, the BSs will always have frequency separation relative to adjacent operating BSs. Thus, the potential for inter-site interference while the aircraft 100 transits its flight path is reduced. Meanwhile, the aircraft 100 will include switching circuitry to enable the aircraft 100 to switch between the corresponding channels as the aircraft 100 transitions from cell to cell.

As an example, the aircraft 100 may be transitioning from BS 110 to the second BS 130. The aircraft 100 may be located at a bearing of 30 degrees from the second BS 130 on an elevation angle of 6 degrees. The aircraft 100 may send an access request on an uplink random access channel to the second BS 130 in a corresponding one of the sector wide, control channel beams 350. The second BS 130 may acknowledge the request, while the aircraft 100 communicates its position data to the second BS 130. After the second BS 130 learns the position data including, for example, location, velocity and heading of the aircraft 100. With the position data, the second BS 130 may calculate the azimuth and elevation corresponding to the aircraft 100 and direct one of the traffic channel beams 340 to be formed in an optimal pointing direction for the aircraft 100. A telemetry cable may be provided, as a low-bit-rate data cable, for providing beam formation information to the antenna assembly 250, separately from the two separate RF chains. Although the two separate RF chains could feed respective different antennas (or sets of antenna elements), in some cases the two separate RF chains could feed the same antenna (or set of antenna elements) and allow the antenna (or antenna elements) to function as two antennas even though they are physically a single structure.

Thus, a network for providing ATG wireless communication in various cells in accordance with an example embodiment may include multiple base stations that each include an antenna array defining sectors having respective widths defined in azimuth, and a beamforming control module. The beamforming control module may be configured to communicate with the antenna array via a first RF chain to perform beamforming defining traffic channel beams having a first width, and a second RF chain to perform beamforming defining control channel beams having a second width. The second width may be greater than the first width.

The base station, beamforming control module and/or antenna arrays of various examples may be modified, augmented or altered in various ways. For example, in some cases, the beamforming control module may be configured to generate the traffic channel beams and the control channel beams simultaneously via the first and second RF chains, respectively. In some examples, the second width is substantially equal to a width of each sector. In some cases, the first width is about 2 degrees to about 5 degrees in azimuth. Alternatively or additionally, the second width may be about two to ten times larger than the first width. In some examples, each sector is about 30 degrees to about 60 degrees wide in azimuth. In an example embodiment, a remote radio head may be disposed proximate to the antenna array. In such examples, the remote radio head may receive location information to enable the remote radio head to employ the second RF chain to provide the traffic channel beams to an aircraft while tracking the aircraft. In some cases, all sectors of the base station employ separate transmit and receive channels. In such an example, the separate transmit and receive channels of the base station may be different than transmit and receive channels of each adjacent base station of the network. Alternatively or additionally, the antenna array may be fed by both the first and second RF chains to enable the antenna array to have one physical structure but functionally act as two different antennas. In some embodiments, the first RF chain may be split to supply two antennas serving a single control channel sector.

Accordingly, some example embodiments described herein may provide architectures for improved ATG wireless communication performance. In this regard, some example embodiments may provide for base stations having antenna structures that facilitate providing wireless communication coverage in vertical and horizontal directions with sufficient elevation to communicate with aircraft at high elevations. The base stations employ antenna technology that allows different sized control and traffic channels to be provided so that traffic channels can track aircraft transiting through the network.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A base station within a network for providing air-to-ground (ATG) wireless communication in various cells, the base station comprising:
   an antenna array defining a plurality of wedge shaped ATG communication sectors having respective widths defined in azimuth;
   a beamforming control module configured to communicate with the antenna array via a first RF chain to perform beamforming defining traffic channel beams having a first width, and a second RF chain to perform beamforming defining control channel beams having a second width, the second width being greater than the first width, and
   a remote radio head disposed between the antenna array and the beamforming control module,
   wherein the remote radio head receives location information to enable the remote radio head to employ the first RF chain to provide the traffic channel beams to an aircraft while tracking the aircraft.

2. The base station of claim 1, wherein the beamforming control module is configured to generate the traffic channel beams and the control channel beams simultaneously via the first and second RF chains, respectively.

3. The base station of claim 1, wherein the second width is substantially equal to a width of each ATG communication sector.

4. The base station of claim 3, wherein the first width is about 2 degrees to about 5 degrees in azimuth.

5. The base station of claim 1, wherein the second width is about two to ten times larger than the first width.

6. The base station of claim 1, wherein each ATG communication sector is about 30 degrees to about 60 degrees wide in azimuth.

7. The base station of claim 1, wherein all sectors of the base station employ separate transmit and receive channels.

8. The base station of claim 7, wherein the separate transmit and receive channels of the base station are different than transmit and receive channels of each adjacent base station of the network.

9. The base station of claim 1, wherein the antenna array is fed by both the first and second RF chains to enable the antenna array to have one physical structure but functionally act as two different antennas.

10. The base station of claim 1, wherein the remote radio head is provided proximate to the antenna array at a top portion of a tower or mast associated with the base station.

11. A network for providing air-to-ground (ATG) wireless communication in various cells, comprising:
   a first ATG base station having a first antenna array defining a plurality of first sectors having respective widths defined in azimuth; and
   a second ATG base station having a second antenna array defining a plurality of second sectors having respective widths defined in azimuth,
   wherein the first ATG base station and the second ATG base station are disposed offset from each other along a first direction,
   wherein each of the first and second ATG base stations includes a beamforming control module configured to communicate with the first and second antenna arrays, respectively, via a first RF chain to perform beamforming defining traffic channel beams having a first width, and a second RF chain to perform beamforming defining control channel beams having a second width, the second width being greater than the first width, wherein each of the first ATG base station and the second ATG base station comprises a remote radio head disposed between the beamforming control module and the first and second antenna arrays, and wherein the remote radio head receives location information to enable the remote radio head to employ the second RF chain to provide the traffic channel beams to an aircraft while tracking the aircraft.

12. The network of claim 11, wherein the beamforming control module is configured to generate the traffic channel beams and the control channel beams simultaneously via the first and second RF chains, respectively.

13. The network of claim 11, wherein the second width is substantially equal to a width of each sector.

14. The network of claim 13, wherein the first width is about 2 degrees to about 5 degrees in azimuth.

15. The network of claim 11, wherein the second width is about two to ten times larger than the first width.

16. The network of claim 11, wherein each sector is about 30 degrees to about 60 degrees wide in azimuth.

17. The network of claim 11, wherein all sectors of the first and second ATG base stations employ separate transmit and receive channels.

18. The network of claim 17, wherein the separate transmit and receive channels of the first ATG base station are different than transmit and receive channels of the second ATG base station.

19. The network of claim 11, wherein the antenna array is fed by both the first and second RF chains to enable the first and second antenna arrays to each have one physical structure but functionally act as two different antennas.

* * * * *